(12) United States Patent
Wen

(10) Patent No.: US 11,958,227 B2
(45) Date of Patent: Apr. 16, 2024

(54) MIXING DEVICE FOR FORMING A MOLDING MATERIAL FOR SHOE SOLES

(71) Applicant: Hsiu-Feng Wen, Taichung (TW)

(72) Inventor: Hsiu-Feng Wen, Taichung (TW)

( * ) Notice: Subject to any disclaimer, the term of this patent is extended or adjusted under 35 U.S.C. 154(b) by 420 days.

(21) Appl. No.: 17/371,688

(22) Filed: Jul. 9, 2021

(65) Prior Publication Data

US 2022/0242030 A1 Aug. 4, 2022

(30) Foreign Application Priority Data

Feb. 1, 2021 (TW) .................... 110201206

(51) Int. Cl.
| | | |
|---|---|---|
| B29C 48/395 | (2019.01) | |
| B01F 29/25 | (2022.01) | |
| B01F 35/71 | (2022.01) | |
| B29C 48/285 | (2019.01) | |

(52) U.S. Cl.
CPC .......... *B29C 48/395* (2019.02); *B01F 29/251* (2022.01); *B01F 35/71* (2022.01); *B29C 48/285* (2019.02); *B01F 35/71705* (2022.01)

(58) Field of Classification Search
CPC . B29C 48/395; B29C 48/285; B29C 48/2886; B29C 48/29; B29C 48/297; B29C 48/397; B29C 48/585; B01F 29/251; B01F 35/71; B01F 35/71705; B29K 2075/00; B29K 2467/00; B29K 2475/00
USPC .................................... 366/149, 172.1–172.2
See application file for complete search history.

(56) References Cited

U.S. PATENT DOCUMENTS

| | | | | |
|---|---|---|---|---|
| 3,051,455 A | * | 8/1962 | Magester | B29B 7/42 366/159.1 |
| 4,124,307 A | * | 11/1978 | Anisic | B29B 7/428 366/147 |
| 4,140,299 A | * | 2/1979 | Henderson | B01F 33/82 366/181.7 |
| 4,275,033 A | * | 6/1981 | Schulte | B29B 7/748 366/182.1 |
| 5,141,328 A | * | 8/1992 | Dilley | B01F 27/94 366/147 |
| 8,142,066 B2 | * | 3/2012 | Chou | B29C 48/297 366/156.1 |
| 2010/0319856 A1 | * | 12/2010 | Chou | B01F 23/53 156/356 |
| 2022/0242030 A1 | * | 8/2022 | Wen | B29C 48/395 |

* cited by examiner

*Primary Examiner* — Charles Cooley
(74) *Attorney, Agent, or Firm* — Dykema Gossett PLLC

(57) ABSTRACT

A mixing device includes a base, a side tube and a primary extruder screw. The base includes an upper case body and a lower case body cooperating with each other to define an accommodating space. The upper case body has a first inlet and a second inlet communicating with the accommodating space and adapted respectively for passage of two materials into the accommodating space therethrough. The lower case body has a third inlet communicating with the accommodating space. The side tube cooperates with the third inlet to be adapted for passage of elastic fillers into the accommodating space therethrough. The primary extruder screw is operable for mixing the elastic fillers with a reaction product made by the two materials to form a molding material.

12 Claims, 7 Drawing Sheets

MIXING DEVICE FOR FORMING A MOLDING MATERIAL FOR SHOE SOLES

CROSS-REFERENCE TO RELATED APPLICATION

This application claims priority to Taiwanese Utility Model Patent Application No. 110201206, filed on Feb. 1, 2021.

FIELD

The disclosure relates to a mixing device, and more particularly to a mixing device for forming a molding material for shoe soles.

BACKGROUND

Nowadays, existing molding materials for shoe soles are generally made from polyurethanes formed by reacting a first fundamental material and a second fundamental material different from the first fundamental material. Thus, a conventional mixing device is generally disposed with two inlets, respectively for passage of the first fundamental material and the second fundamental material into the conventional mixing device to form a molding material (i.e., polyurethanes).

However, the first and second fundamental materials generally are a polyol and an isocyanate, respectively, and the molding material for a shoe sole is relatively heavy. Since customers are in the market for shoe soles that are lightweight and that have greater portability, shoe soles made from the molding material are too heavy and cannot satisfy customer expectations. A relatively lightweight molding material has been developed by adding an additional material to the abovementioned fundamental materials, but the abovementioned conventional mixing device cannot meet the structural requirements that will enable the additional material to be fed thereinto.

SUMMARY

Therefore, an object of the disclosure is to provide a mixing device that can alleviate the drawback of the prior art.

According to the disclosure, the mixing device is adapted for mixing a first material, a second material and a plurality of elastic fillers to form a molding material. The mixing device includes a base, a side tube, a primary extruder screw and a secondary extruder screw. The base includes an upper case body and a lower case body that is coupled to the upper case body and that cooperates with the upper case body to define an accommodating space. The upper case body has a first inlet and a second inlet that communicate with the accommodating space and that are adapted respectively for passage of the first and second materials into the accommodating space therethrough. The lower case body has a third inlet and an outlet that communicate with the accommodating space. The side tube is connected to the third inlet of the lower case body and cooperates with the third inlet for passage of the elastic fillers into the accommodating space therethrough. The primary extruder screw is disposed within the accommodating space and is rotatable about a first axis. The secondary extruder screw extends through the side tube, is rotatable about a second axis that is transverse to the first axis, and is adapted for conveying the elastic fillers into the accommodating space. The primary extruder screw is operable for mixing the elastic fillers and a reaction product, which is made by reacting the first material and the second material, in the accommodating space to form the molding material, and extruding the molding material out of the accommodating space via the outlet.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
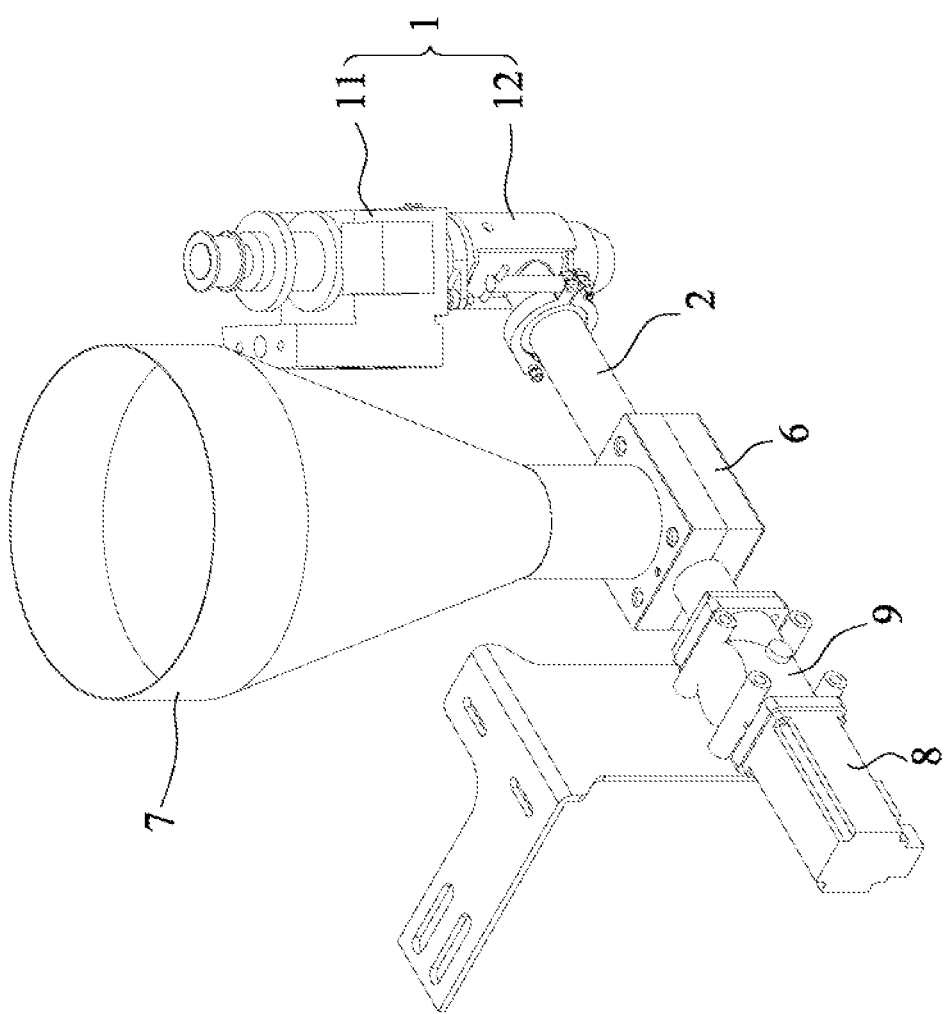
FIG. 1 is a perspective view of an embodiment of a mixing device according to the disclosure.
Figure 2:
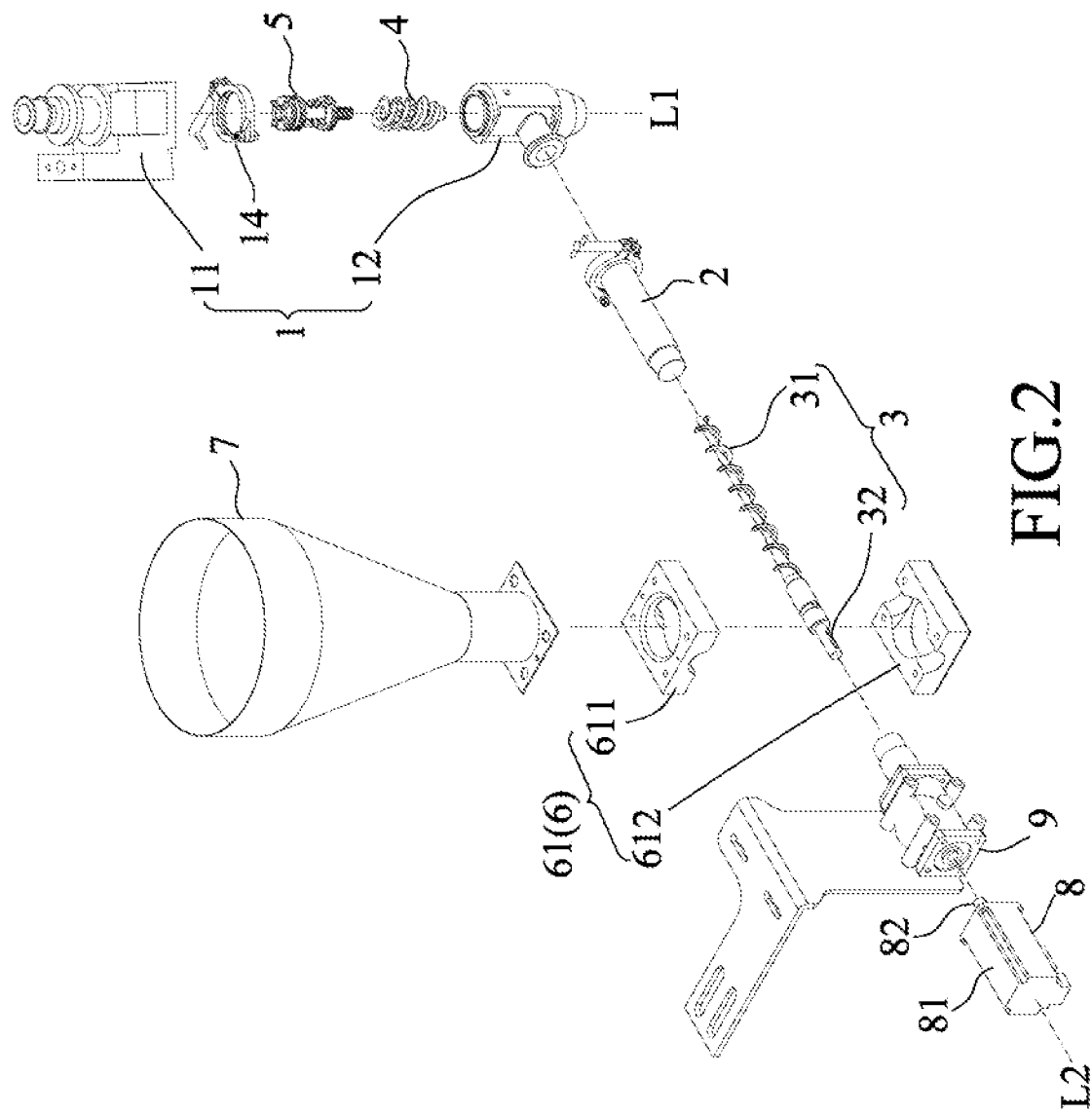
FIG. 2 is an exploded perspective view of the embodiment.

Referring to FIGS. 1 and 2, an embodiment of a mixing device according to the disclosure is adapted for mixing a first material (not shown), a second material (not shown) and a plurality of elastic fillers (not shown) to form a molding material (not shown). The mixing device includes abase 1, aside tube 2, a primary extruder screw 4, a secondary extruder screw 3, a connecting rod 5, a fastening seat 6, a feed hopper 7, a motor 8 and a transmission seat 9.

Figure 3:
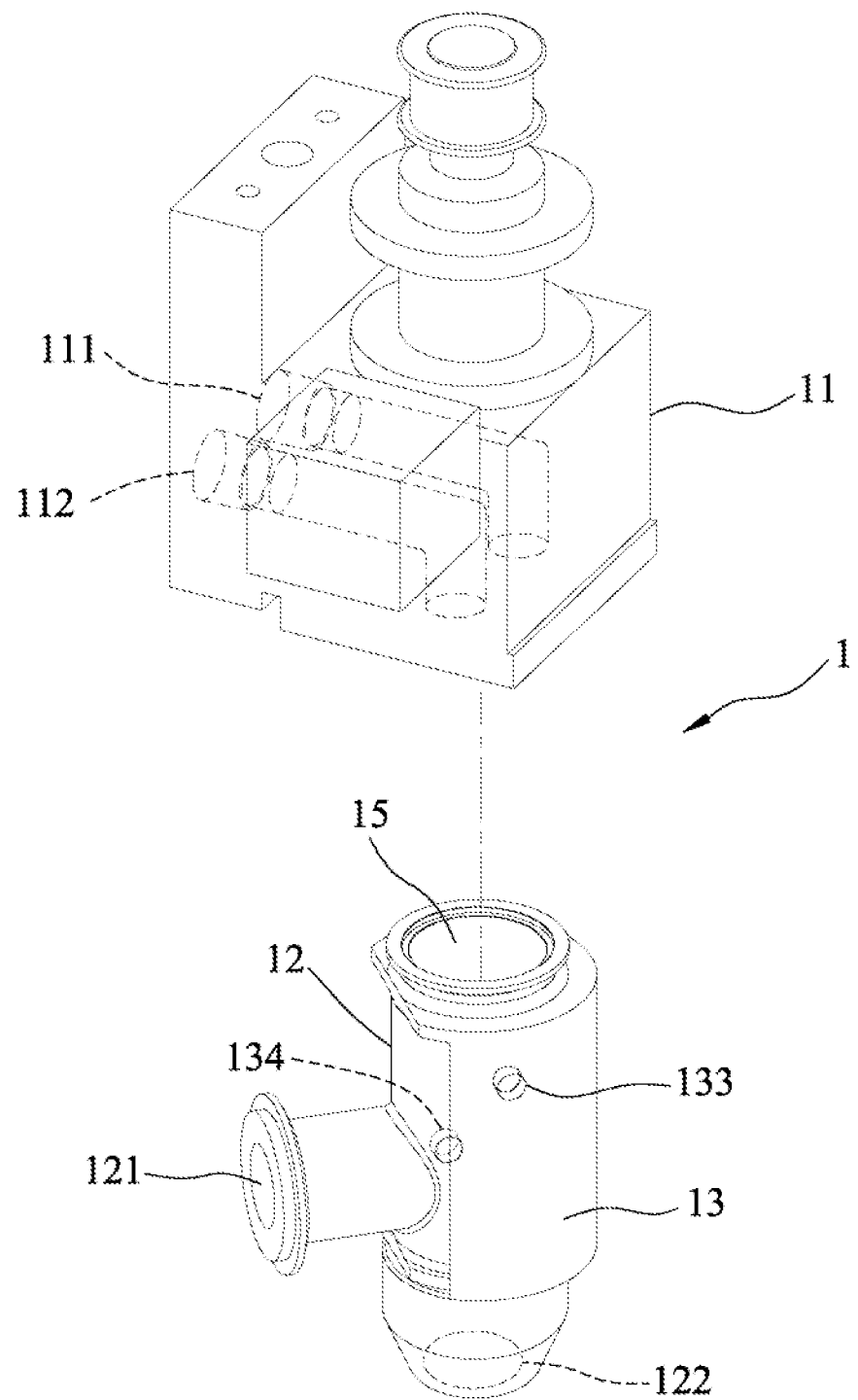
FIG. 3 is a fragmentary exploded perspective view of a base of the embodiment.
Figure 4:
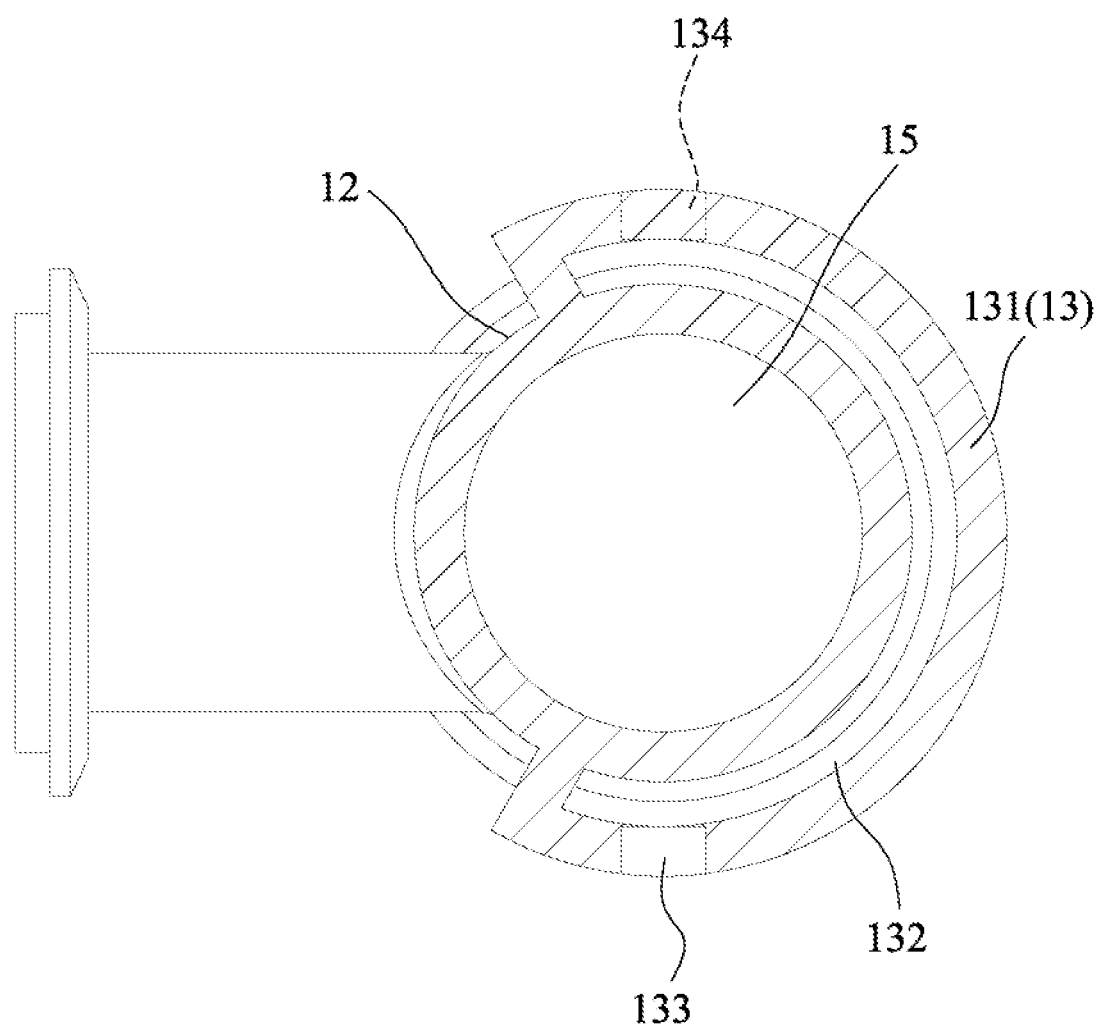
FIG. 4 is a sectional view of a lower case body and a heat dissipating unit of the base of the embodiment.

Referring to FIGS. 3 and 4, the base 1 includes an upper case body 11, a lower case body 12 and a heat dissipating unit 13. The lower case body 12 is coupled to the upper case body 11 and cooperates with the upper case body 11 to define an accommodating space 15. The heat dissipating unit 13 is disposed on the lower case body 12. The upper case body 11 has a first inlet 111 and a second inlet 112 that communicate with the accommodating space 15 and that are adapted respectively for passage of the first and second materials into the accommodating space 15 therethrough. The lower case body 12 has a third inlet 121 and an outlet 122 that communicate with the accommodating space 15. The heat dissipating unit 13 includes a shell body 131 that is connected to the lower case body 12, that cooperates with the lower case body 12 to define a heat-transferring space 132 therebetween, and that has an entering opening 133 and a discharging opening 139. The entering opening 133 communicates with the heat-transferring space 132 and is adapted for a coolant to enter the heat-transferring space 132 therethrough. The discharging opening 139 communicates with the heat-transferring space 132 and is adapted for the coolant to exit the heat-transferring space 132 therethrough. It is noted that, in this embodiment, the heat-transferring space 132 has a uniform width between the shell body 131 and the lower case body 12, and the shell body 131 and the lower case body 12 are formed as one piece. However, in practice, variations including, but not limited to, threaded connection and pivotal connection may be used for the connection between the shell body 131 and the lower case body 12. Moreover, in this embodiment, the base 1 further includes a circular securing member 19 (see FIG. 2) surrounding a joint between the upper case body 11 and the lower case body 12 to secure the upper case body 11 and the lower case body 12 to each other.

Figure 5:
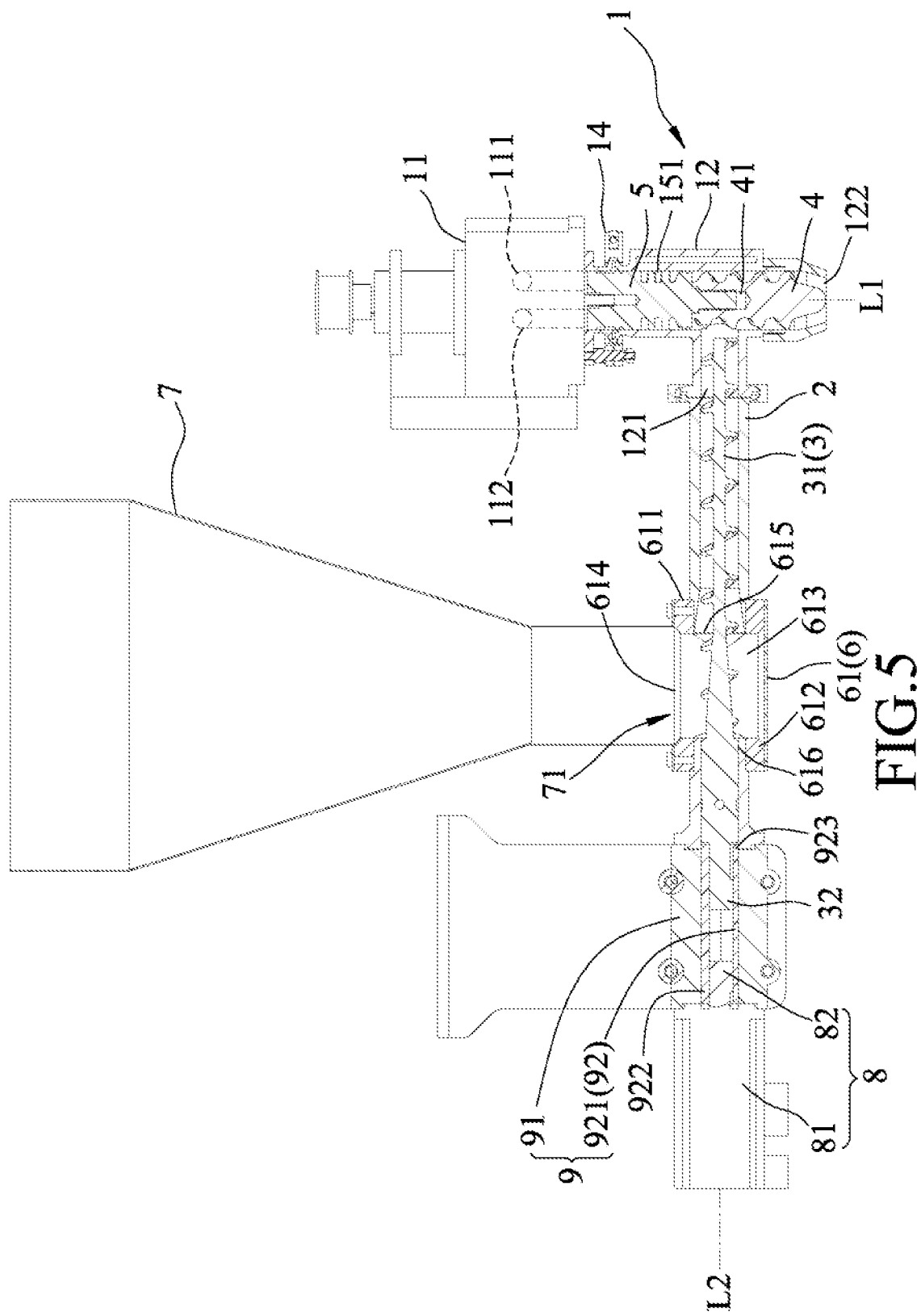
FIG. 5 is a partly sectional view of the embodiment.
Figure 6:
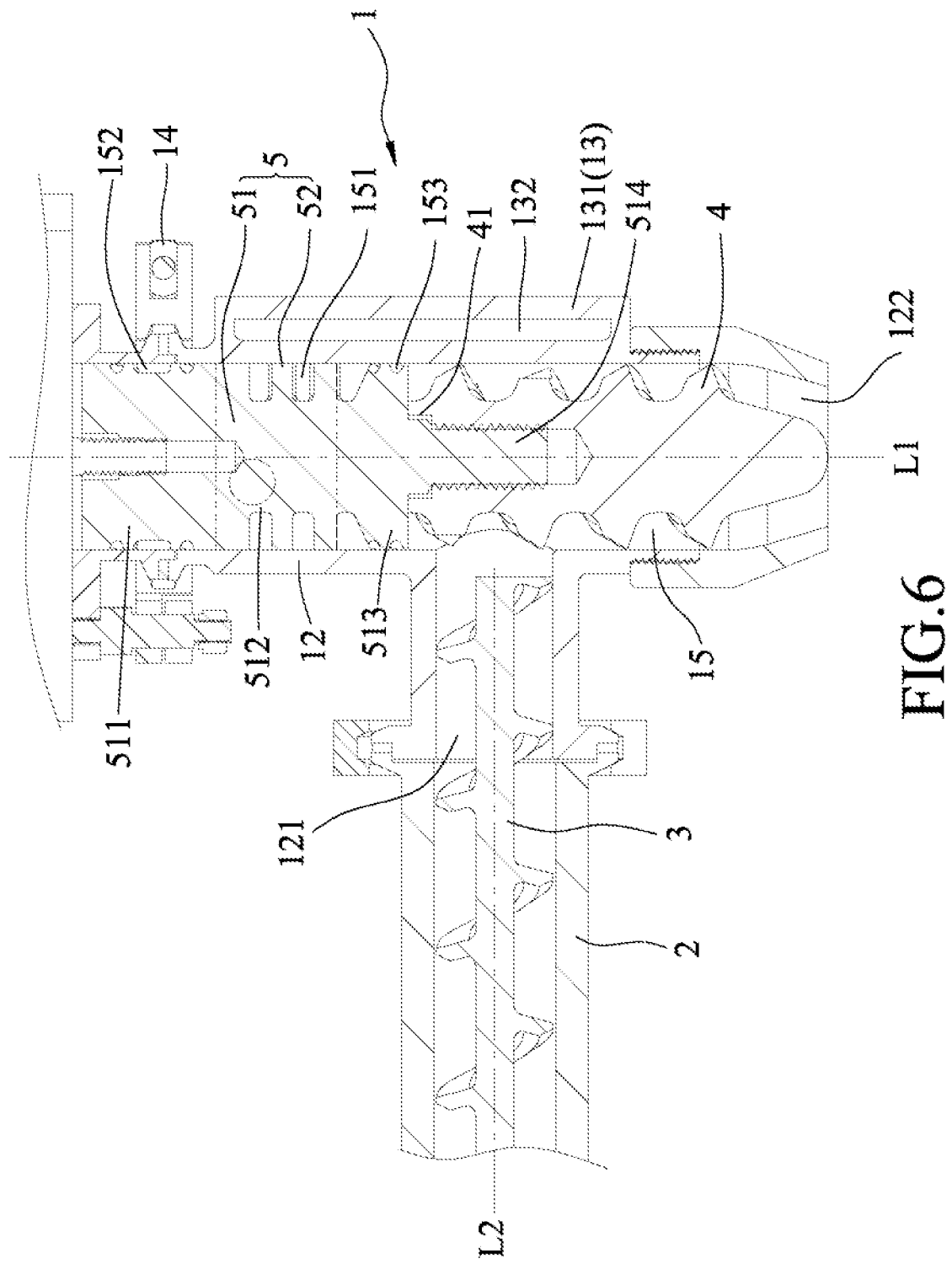
FIG. 6 is a fragmentary, enlarged view of FIG. 5.

Referring to FIGS. 5 and 6, the side tube 2 is connected to the third inlet 121 of the lower case body 12 of the base 1 and cooperates with the third inlet 121 for passage of the elastic fillers into the accommodating space 15 therethrough.

The primary extruder screw 4 is disposed within the accommodating space 15 of the base 1, is rotatable about a first axis (L1), and is formed with a threaded hole 41 at a top end thereof to be threadedly engaged with the connecting rod 5 so that the primary extruder screw 4 and the connecting rod 5 are co-rotatable. In this embodiment, the primary extruder screw 4 and the connecting rod 5 are driven, but not limited to being driven, by a servomotor (not shown) to co-rotate. There will be no further details describing the servomotor since the servomotor is widely-understood by those skilled in the art.

The secondary extruder screw 3 has a main body 31 that extends through the side tube 2 and that is rotatable about a second axis (L2) transverse to the first axis (L1), and a secondary extruder screw extended part 32 that extends from the main body 31 and that is connected to the transmission seat 9. The secondary extruder screw 3 is adapted for conveying the elastic fillers into the accommodating space 15 of the base 1, and the primary extruder screw 4 is operable for mixing the elastic fillers and a reaction product, which is made by reacting the first material and the second material, in the accommodating space 15 to form the molding material and extruding the molding material out of the accommodating space 15 via the outlet 122 of the lower case body 12 of the base 1.

Figure 7:
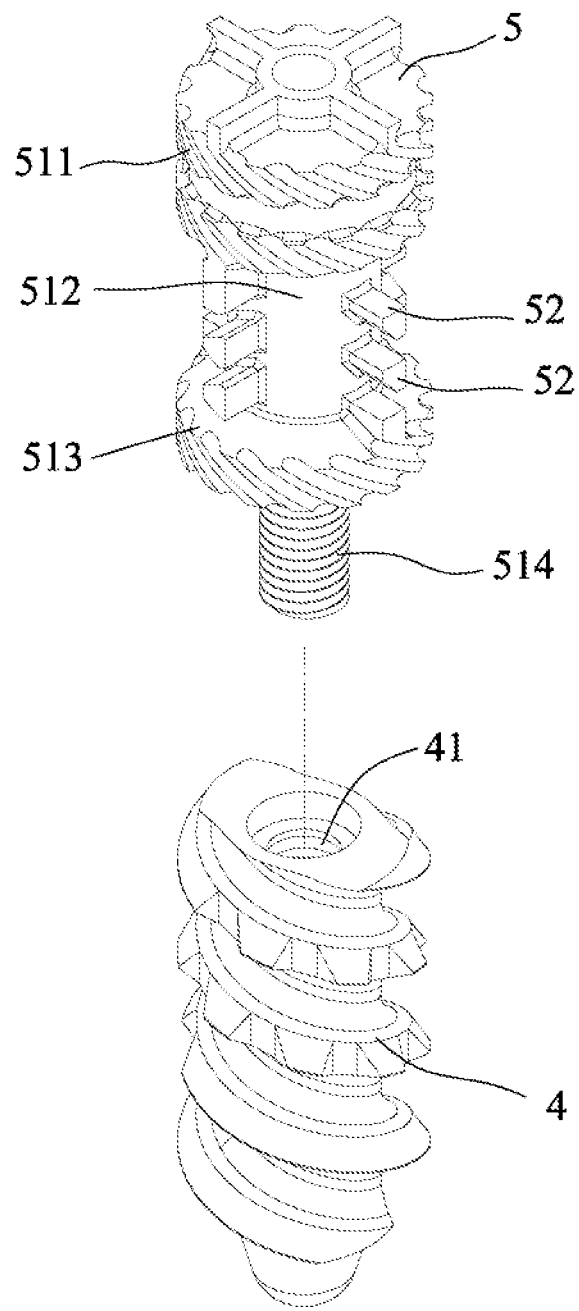
FIG. 7 is an exploded perspective view of a primary extruder screw and a connecting rod of the embodiment.

Referring further to FIG. 7, the connecting rod 5 is disposed within the accommodating space 15 of the base 1, and includes a connecting rod body 51 and a plurality of protrusions 52. The connecting rod body 51 extends along the first axis (L1), and has a top section 511, a bottom section 513 under the top section 511, a connecting section 512 connected between the top section 511 and the bottom section 513, and a threaded section 514 extending downwardly from the bottom section 513. A cross-section of each of the top section 511 and the bottom section 513 perpendicular to the first axis (L1) is larger than that of the connecting section 512. The threaded section 514 threadedly engages with the threaded hole 41 of the primary extruder screw 4.

The accommodating space 15 of the base 1 has a reaction zone 151, an upper channel 152 and a lower channel 153. The reaction zone 151 is located between the connecting rod 5 and the lower case body 12 of the base 1, and communicates with the first inlet 111 and the second inlet 112 of the upper case body 11 of the base 1. Specifically, the reaction zone 151 is defined among the protrusions 52, the connecting section 512 of the connecting rod body 51 of the connecting rod 5 and the lower case body 12, and is adapted for the first material and the second material to react therein. The heat dissipating unit 13 is disposed adjacent to the reaction zone 151. The protrusions 52 protrude from the connecting section 512 of the connecting rod body 51 and are adjacent to the reaction zone 151. The upper channel 152 communicates with the reaction zone 151 and the lower channel 153 communicates with the reaction zone 151. Specifically, the upper channel 152 is defined cooperatively by the top section 511 of the connecting rod body 51 and the lower case body 12, and surrounds the top section 511. The lower channel 153 is defined cooperatively by the bottom section 513 of the connecting rod body 51 and the lower case body 12, and surrounds the bottom section 513. It is noted that a surrounding surface of each of the top section 511 and the bottom section 513 is configured to be formed with helical ridges. The upper channel 152 of the accommodating space 15 is defined between the lower case body 12 and the helical ridges of the top section 511 of the connecting rod body 51. The lower channel 153 of the accommodating space 15 is defined between the lower case body 12 and the helical ridges of the bottom section 513 of the connecting rod body 51. It is also noted that, the first material and the second material are liquids when they flow from the upper case body 11 into the accommodating space 15 between the connecting rod 5 and the lower case body 12. However when the reaction product, which is made by reacting the first and second materials, is mixed with the elastic fillers in the accommodating space 15 between the primary extruder screw 4 and the lower case body 12, the mixture becomes more viscous. Therefore, the pitch of the primary extruder screw 4 is configured to be greater than the distance between each of two adjacent ridges of the top section 511 and the bottom section 513, and the flight width of the primary extruder screw 4 is configured to be greater than thickness of the ridges of the top section 511 and the bottom section 513.

As shown in FIGS. 2 and 5, the fastening seat 6 is connected between the transmission seat 9 and the side tube 2, and includes a fastening shell 61. The fastening shell 61 includes a top seat body 611 and a bottom seat body 612, and has a hopper-connecting hole 614, a tube-connecting hole 615 and a seat-connecting hole 616. The bottom seat body 612 is coupled to the top seat body 611 and cooperates with the top seat body 611 to define a feeding space 613 that communicates with the hopper-connecting hole 614 and the tube-connecting hole 615. A lateral surrounding surface of the top seat body 611 and a lateral surrounding surface of the bottom seat body 612 cooperatively define a lateral surrounding surface of the fastening shell 61. The hopper-connecting hole 614 is formed at a top end of the top seat body 611. The tube-connecting hole 615 and the transmission-seat-connecting hole 616 are respectively formed at two opposite sides of the lateral surrounding surface of the fastening shell 61. The side tube 2 has opposite ends connected respectively to the third inlet 121 of the lower case body 12 of the base 1 and the tube-connecting hole 615 of the fastening shell 61. The secondary extruder screw 3 extends through the tube-connecting hole 615 and the seat-connecting hole 616 of the fastening shell 61 and is connected to the transmission seat 9.

The feed hopper 7 has a feeding opening 71 (see FIG. 5) connected to the hopper-connecting hole 614 of the fastening seat 6, and is adapted for pouring of the elastic fillers into the feeding space 613 of the fastening seat 6 via the feeding opening 71.

The motor 8 is connected to the transmission seat 9. In this embodiment, the motor 8 has a motor body 81 and a motor extended part 82. The motor body 81 is operable to convert electrical energy into kinetic energy. The motor extended part 82 extends from the motor body 81 and is drivable by the motor body 81 to rotate. Since the relevant features of this disclosure do not concern the specific configuration of the motor 8, which are known in the art, further details of the same are omitted herein for the sake of brevity.

The transmission seat 9 includes a transmission shell 91 and a transmission shaft 92 that is disposed within the transmission shell 91, and that is connected between the motor 8 and the secondary extruder screw 3. The transmission shaft 92 has a shaft body 921. The shaft body 921 has a motor engaging part 922 and a screw engaging part 923.

The motor engaging part 922 is adjacent to the motor 8 and is engaged with the motor extended part 82 of the motor 8. The screw engaging part 923 is adjacent to the secondary extruder screw 3 and is engaged with the secondary extruder screw extended part 32 of the secondary extruder screw 3. The motor 8 is operable to drive the transmission shaft 92 to rotate to thereby drive the secondary extruder screw 3 to rotate. Specifically, when the motor 8 is actuated, the motor extended part 82 starts to rotate and drives rotation of the secondary extruder screw 3 via the transmission shaft 92.

The operation of this embodiment will be described below. In practice, the first material and the second material may respectively be a polyol and an isocyanate, and each of the first material and the second material has a relative density that is measured with respect to water, and that may range from 0.8 to 0.9. Generally, the elastic fillers are manufactured by a processing method using polyols and isocyanates, but a processing method using esters or ethers having properties similar to the polyols and the isocyanates may also be adopted to manufacture the elastic fillers. The elastic fillers may have a granular form, and have a relative density that is measured with respect to water, and that may range from 0.1 to 0.2. In addition, the maximum particle size of the elastic fillers generally ranges between 3 to 9 millimeters, but exceptions are possible. There will be no further details describing the processing method since the processing method for manufacturing the elastic fillers is well-understood by those skilled in the art.

When the mixing device starts to form the molding material, the first material and the second material are fed into the accommodating space 15 of the base 1 through the first inlet 111 and the second inlet 112 of the upper base body 11 of the base 1 respectively, in a manner that the first material and the second material flow into the reaction zone 151 of the accommodating space 15 through the upper channel 152 of the accommodating space 15.

Then, the first material and the second material react with each other in the reaction zone 151 and thereby produce energy in the form of heat. In the meantime, to dissipate the heat generated by the reaction, the coolant may be continuously fed into the heat-transferring space 132 through the entering opening 133 of the heat dissipating unit 13, and be discharged from the heat-transferring space 132 through the discharging opening 134 after absorbing the heat generated by the reaction and having its temperature increased. Furthermore, the helical ridges formed at the bottom section 513 of the connecting rod body 51 may increase the duration of the first material and the second material staying in the reaction zone 151, and may reduce the speed of the reaction product flowing through the lower channel 153 of the accommodating space 15, so that a better heat dissipation effect may be achieved.

The elastic fillers are fed from the feed hopper 7 into the feeding space 613 of the fastening seat 6, and are conveyed via rotation of the secondary extruder screw 3 into the side tube 2 through the tube-connecting hole 615 of the fastening seat 6. Then, the rotation of the secondary extruder screw 3 further stirs the elastic fillers and conveys the elastic fillers into the accommodating space 15 of the base 1 through the side tube 2.

At the end of the operation, the primary extruder screw 4 is operated to mix the elastic fillers that are conveyed into the accommodating space 15 and the reaction product that flows through the lower channel 153 of the accommodating space 15 to form the lightweight molding material.

In summary, by virtue of the secondary extruder screw 3 conveying the elastic fillers into the accommodating space 15, the primary extruder screw 4 mixing the elastic fillers and the reaction product made by reacting the first and second materials, and the heat dissipating unit 13 dissipating the heat, a relatively lightweight molding material for shoe soles can be formed and the purpose of the disclosure may be effectively fulfilled.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure. While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A mixing device adapted for mixing a first material, a second material and a plurality of elastic fillers to form a molding material, said mixing device comprising:

a base including an upper case body, and a lower case body that is coupled to said upper case body and that cooperates with said upper case body to define an accommodating space, said upper case body having a first inlet and a second inlet that communicate with said accommodating space and that are adapted respectively for passage of the first and second materials into said accommodating space therethrough, said lower case body having a third inlet and an outlet that communicate with said accommodating space;

a side tube connected to said third inlet of said lower case body and cooperating with said third inlet for passage of the elastic fillers into said accommodating space therethrough;

a primary extruder screw disposed within said accommodating space and rotatable about a first axis;

a secondary extruder screw extending through said side tube, rotatable about a second axis that is transverse to the first axis, and adapted for conveying the elastic fillers into said accommodating space; and a connecting rod disposed within said accommodating space and connected co-rotatable to said primary extruder screw, said accommodating space having a reaction zone that is located between said connecting rod and said lower case body of said base, that communicates with said first inlet and said second inlet of said upper case body of said base, and that is adapted for the first material and the second material to react therein;

wherein said primary extruder screw is operable for mixing the elastic fillers and a reaction product, which is made by reacting the first material and the second material, in said accommodating space to form the molding material, and extruding the molding material out of said accommodating space via said outlet;

wherein said connecting rod includes a connecting rod body connected to a top end of said primary extruder screw, and a plurality of protrusions protruding from said connecting rod body and adjacent to said reaction zone;

wherein said connecting rod body of said connecting rod extends along the first axis and has
- a top section,
- a bottom section under said top section, and
- a connecting section connected between said top section and said bottom section;

wherein a cross-section of each of said top section and said bottom section perpendicular to the first axis is larger than that of said connecting section;

wherein said protrusions of said connecting rod protrude from said connecting section of said connecting rod body, said reaction zone of said accommodating space being defined among said protrusions, said connecting section and said lower case body; and wherein said accommodating space further has
- an upper channel defined cooperatively by said top section and said lower case body and communicating with said reaction zone, and
- a lower channel defined cooperatively by said bottom section and said lower case body and communicating with said reaction zone.

2. The mixing device as claimed in claim 1, wherein said connecting rod body of said connecting rod further has a threaded section extending downwardly from said bottom section, and said top end of said primary extruder screw is formed with a threaded hole threadedly engaged with said threaded section.

3. The mixing device as claimed in claim 1, wherein said base further includes a heat dissipating unit disposed on said lower case body of said base and adjacent to said reaction zone of said accommodating space.

4. The mixing device as claimed in claim 3, wherein said heat dissipating unit includes a shell body that is connected to said lower case body of said base, that cooperates with said lower case body to define a heat-transferring space therebetween, and that has
- an entering opening communicating with said heat-transferring space and adapted for a coolant to enter said heat-transferring space therethrough, and
- a discharging opening communicating with said heat-transferring space and adapted for the coolant to exit said heat-transferring space therethrough.

5. The mixing device as claimed in claim 1, further comprising a transmission seat and a motor connected to said transmission seat, said transmission seat including a transmission shell and a transmission shaft that is disposed within said transmission shell, and that is connected between said motor and said secondary extruder screw, said motor being operable to drive said transmission shaft to rotate to thereby drive said secondary extruder screw to rotate.

6. The mixing device as claimed in claim 5, further comprising:
- a fastening seat connected between said transmission seat and said side tube, and including a fastening shell that defines a feeding space therein and that has a hopper-connecting hole and a tube-connecting hole communicating with said feeding space, said secondary extruder screw extending through said fastening seat, said side tube having opposite ends connected respectively to said third inlet of said lower case body and said tube-connecting hole; and
- a feed hopper having a feeding opening that is connected to said hopper-connecting hole of said fastening seat, and adapted for pouring of the elastic fillers into said feeding space of said fastening seat via said feeding opening.

7. A mixing device adapted for mixing a first material, a second material and a plurality of elastic fillers to form a molding material, said mixing device comprising:
- a base including an upper case body, and a lower case body that is coupled to said upper case body and that cooperates with said upper case body to define an accommodating space, said upper case body having a first inlet and a second inlet that communicate with said accommodating space and that are adapted respectively for passage of the first and second materials into said accommodating space therethrough, said lower case body having a third inlet and an outlet that communicate with said accommodating space;
- a side tube connected to said third inlet of said lower case body and cooperating with said third inlet for passage of the elastic fillers into said accommodating space therethrough;
- a primary extruder screw disposed within said accommodating space and rotatable about a first axis; and
- a secondary extruder screw extending through said side tube, rotatable about a second axis that is transverse to the first axis, and adapted for conveying the elastic fillers into said accommodating space;
- a transmission seat and a motor connected to said transmission seat, said transmission seat including a transmission shell and a transmission shaft that is disposed within said transmission shell, and that is connected between said motor and said secondary extruder screw, said motor being operable to drive said transmission shaft to rotate to thereby drive said secondary extruder screw to rotate;
- a fastening seat connected between said transmission seat and said side tube, and including a fastening shell that defines a feeding space therein and that has a hopper-connecting hole and a tube-connecting hole communicating with said feeding space, said secondary extruder screw extending through said fastening seat, said side tube having opposite ends connected respectively to said third inlet of said lower case body and said tube-connecting hole; and
- a feed hopper having a feeding opening that is connected to said hopper-connecting hole of said fastening seat, and adapted for pouring of the elastic fillers into said feeding space of said fastening seat via said feeding opening;

wherein said primary extruder screw is operable for mixing the elastic fillers and a reaction product, which is made by reacting the first material and the second material, in said accommodating space to form the molding material, and extruding the molding material out of said accommodating space via said outlet.

8. The mixing device as claimed in claim 7, further comprising a connecting rod disposed within said accommodating space and connected co-rotatably to said primary extruder screw, said accommodating space having a reaction zone that is located between said connecting rod and said lower case body of said base, that communicates with said first inlet and said second inlet of said upper case body of said base, and that is adapted for the first material and the second material to react therein.

9. The mixing device as claimed in claim 8, wherein said connecting rod includes:
   a connecting rod body connected to a top end of said primary extruder screw; and
   a plurality of protrusions protruding from said connecting rod body and adjacent to said reaction zone.

10. The mixing device as claimed in claim 9, wherein:
    said connecting rod body of said connecting rod extends along the first axis and has
    a top section,
    a bottom section under said top section,
    a connecting section connected between said top section and said bottom section, and
    a threaded section extending downwardly from said bottom section, said top end of said primary extruder screw being formed with a threaded hole threadedly engaged with said threaded section;
    a cross-section of each of said top section and said bottom section perpendicular to the first axis is larger than that of said connecting section;
    said protrusions of said connecting rod protrude from said connecting section of said connecting rod body, said reaction zone of said accommodating space being defined among said protrusions, said connecting section and said lower case body; and
    said accommodating space further has
    an upper channel defined cooperatively by said top section and said lower case body and communicating with said reaction zone, and
    a lower channel defined cooperatively by said bottom section and said lower case body and communicating with said reaction zone.

11. The mixing device as claimed in claim 7, wherein said base further includes a heat dissipating unit disposed on said lower case body of said base and adjacent to said reaction zone of said accommodating space.

12. The mixing device as claimed in claim 11, wherein said heat dissipating unit includes a shell body that is connected to said lower case body of said base, that cooperates with said lower case body to define a heat-transferring space therebetween, and that has
    an entering opening communicating with said heat-transferring space and adapted for a coolant to enter said heat-transferring space therethrough, and
    a discharging opening communicating with said heat-transferring space and adapted for the coolant to exit said heat-transferring space therethrough.

* * * * *